United States Patent [19]

O'Neil et al.

[11] Patent Number: 5,025,906
[45] Date of Patent: Jun. 25, 1991

[54] REMOTE SENSING VISCOUS FLUID COUPLING

[75] Inventors: Walter K. O'Neil, Birmingham; Carl E. Rockey, Marshall; Robert J. Mohan, Canton, all of Mich.

[73] Assignee: Eaton Corporation, Cleveland, Ohio

[21] Appl. No.: 559,022

[22] Filed: Jul. 26, 1990

[51] Int. Cl.⁵ .............................................. F16D 19/00
[52] U.S. Cl. .................................. 192/58 B; 192/82 T
[58] Field of Search ............................ 192/58 B, 82 T

[56] References Cited

U.S. PATENT DOCUMENTS

| | | | |
|---|---|---|---|
| 1,410,361 | 3/1922 | Blackmore | 236/353 |
| 1,433,399 | 10/1922 | Modine | 236/35 |
| 3,055,473 | 9/1962 | Oldberg | 192/58 |
| 3,103,308 | 9/1963 | Wolfram | 230/270 |
| 3,207,279 | 9/1965 | Ahlen | 192/57 |
| 3,684,397 | 8/1972 | Elmer | 416/39 |
| 3,809,197 | 5/1974 | Clancey | 192/58 |
| 4,056,178 | 11/1977 | Detty | 192/58 |
| 4,271,945 | 6/1981 | Budinski | 192/58 |
| 4,291,794 | 9/1981 | Bauer | 192/107 |
| 4,310,084 | 1/1982 | Nonnenmann | 192/58 |
| 4,310,085 | 1/1982 | LaFlame | 192/58 |
| 4,346,797 | 8/1982 | Bopp | 192/58 |
| 4,351,425 | 9/1982 | Bopp | 192/58 |
| 4,458,798 | 7/1984 | Bopp | 192/58 |
| 4,700,823 | 10/1987 | Winckler | 192/107 |
| 4,828,088 | 5/1989 | Mohan et al. | 192/58 |
| 4,846,325 | 7/1989 | Mohan | 192/58 |
| 4,874,072 | 10/1989 | Mohan et al. | 192/58 |
| 4,898,266 | 2/1990 | Garrett et al. | 192/82 T X |
| 4,898,267 | 2/1990 | Garrett et al. | 192/82 T X |

Primary Examiner—Allan D. Herrmann
Assistant Examiner—Nicholas Whitelaw
Attorney, Agent, or Firm—L. J. Kasper

[57] ABSTRACT

A viscous clutch (10) is typically employed in a fan drive mechanism within a truck or automobile. A shaft (18), driven by the engine (12), rotates a clutch member (42) within the fan drive. The clutch member is arranged for fluid engagement with a body member (60) for the transmission of torque thereto when fluid is disposed in an operating chamber (100) defined by complimentary shear surfaces in the clutch and body members (48,98), respectively. An actuator assembly (30) operates to displace a valving element (196) within the clutch to control the torque transmission therethrough and thus the speed of the output shaft and fan (34) thereof. The actuator is electrically powered by a generator (222) made up of an armature (224) carried by the body member and a plurality of field generating magnets carried by clutch member (42) for rotational interaction therebetween. The clutch is tetherless and receives a slip speed demand signal by an optical or other non-contacting data link to provide tight control of fan speed and engine outlet coolent temperature.

12 Claims, 6 Drawing Sheets

REMOTE SENSING VISCOUS FLUID COUPLING

CROSS REFERENCE

The subject matter of this invention is related to that of U.S. Application No. 07/558968, filed on even date herewith, entitled "Self Powered Viscous Fluid Coupling" by Carl E. Rockey, Walter K. O'Neil, and Robert J. Mohan.

INTRODUCTION

The present invention relates to viscous fluid couplings, and more particularly to such couplings which are controlled as a function of certain parametric variations in their host systems. More particularly still, the present invention relates to viscous fluid couplings employed as vehicle fan drives which are controlled as a function of coolant temperature.

BACKGROUND OF THE INVENTION

Viscous fluid couplings have received wide acceptance in the automobile and truck industry for controlling the amount of torque transmitted to a radiator cooling fan. The most common form of such viscous fluid couplings is the air temperature response type such as illustrated in U.S. Pat. No. 3,055,473. In certain applications, however, it has become desirable to directly sense the temperature of the fluid coolant entering the radiator rather than a temperature of the air passing through the radiator. To date, many arrangements have been proposed to accomplish this result. Typically, these arrangements have made use of wet or dry plate clutches that are pneumatically actuated or electro-pneumatic clutches that are electrically actuated. A major shortcoming of many prior art magnetically actuated clutches or couplings resides in the fact that relatively high torque levels are involved. These high torque levels require relatively massive engagement mechanisms which must be engaged through the action of intense magnetic fields set up by large and expensive inductors. Such inductors draw substantial amounts of energy from the associated vehicle's electrical system and thus reduce overall operating efficiency. Additionally, such devices typically employ relatively large springs which bias a portion of the engagement mechanism toward either the engaging or nonengaging position. Accordingly, the magnetic field must also overcome the force of the biasing springs as well as the mass of the engagement mechanism.

More recently, improved prior art electromechanically actuated viscous fluid couplings have been suggested which employ inductors to establish magnetic fields which activate valves controlling the flow of viscous fluid within the clutch. This arrangement represents an improvement inasmuch as the magnetic field established by the inductor only has to be large enough to move a relatively small valving arm and biasing spring. Although representing an improvement, such devices have inherent inefficiencies inasmuch as their valving arm biasing springs have to be large enough to overcome the kinetic energy of the viscous fluid flowing thereby. Most recently, advanced prior art electromechanically actuated viscous fluid couplings have proposed providing valving elements which are mounted for rotation with one of the viscous clutch members which operate to frictionally engage the other to extract kinetic energy therefrom to move the valving element and thereby vary the torque transmitted between the clutch members. This arrangement is desirable in a simple "ON" and "OFF" type clutch. However, because the amount of kinetic energy to be extracted is related to the differential speed of the clutch plates, it is apparent that a speed differential is not present during all operating modes of the fan and thus an unacceptable time lag may occur between the time a control signal input is received and the clutch responds. This problem is particularly acute in the case of continuously variable fan drives where an adequate energy source for movement of the valving member must be available at all times during operation.

The foregoing shortcomings of the prior art have been addressed by the use of tethers which provide both electrical current to a clutch born actuator from the host vehicle electrical system as well as control logic from host vehicle sensors. Although acceptable in some applications, the use of tethers in fan drive applications, creates packaging problems in the limited space available between the vehicle engine and radiator, requiring costly hardware and elaborate wiring harnesses. Furthermore, the tether assembly is, by nature, cantilevered in front of the clutch and fan assembly and is prone to damage from foreign objects or the fan blades themselves as well as long term degradation due to engine torque induced displacement as well as air borne contaminants typically found in the vehicle engine compartment environment.

It will be apparent from a reading of the specification that the present invention may be advantageously utilized with fluid couplings intended for many different applications. However, the invention is especially useful when applied to a viscous fluid coupling which serves as a drive for a radiator cooling fan of the vehicle engine, and will be described in connection therewith.

BRIEF DESCRIPTION OF THE INVENTION

The present invention is embodied in a viscous fluid clutch of the type including first and second clutch members mounted for relative rotation about a common axis and defining cooperating shear surfaces which operate to transmit torque when a flow of viscous fluid is established therebetween. A valving element is carried by one of the members and is displaceable with respect thereto by an actuator to modulate the viscous fluid flow in response to an electrical current to selectively position the valving element. A grounded sensor provides a control signal as a function of a sensed system parameter. According to the invention, and by way of overcoming the above-described shortcomings of prior art viscous clutches, the viscous fluid clutch is provided with circuit means interconnecting the actuator and a source of electrical current means for controlling the flow of electrical current from the source to the actuator in response to the control signal. A non-contacting signal link interfacing the sensor and circuit means includes a transmitter element in circuit with the sensor operative to radiate the control signal as a function of the parameter measured by the sensor and a receiving element in circuit with the circuit means operative to receive the radiated control signal. This arrangement provides for the input of a remotely generated control signal without the need of a tether or other contacting interface.

The preferred embodiment of the invention finds particular application in a motor vehicle viscous fluid clutch of the type which includes a first clutch member fixed on a shaft for rotation therewith, and a second clutch member supported by the shaft for rotation thereabout and having shear surfaces which coact with complimentary shear surfaces on the first member to define an operating chamber therebetween. The fluid storage chamber is located near the operating chamber and a pump provides a circulating flow of viscous fluid between the chambers. According to the preferred embodiment of the invention, the valving member is mounted coaxially with the second member for rotation therewith and is axially displaceable to frictionally engage a thrust surface defined by the first member to effect modulation of the flow of fluid through a port interconnecting the chambers by angular displacement of the valving element from a first limit of travel in which the element overlays the port to a second limit of travel in which the port is relatively unobstructed.

According to another aspect of the invention, the sensor is disposed in a relatively fixed position spaced from the logic circuit and includes a transmitter element, such as a light emitting diode, which operates to radiate the control signal as a function of the parameter sensed by the sensor. Furthermore, the logic circuit includes a receiving element, such as a phototransistor, in circuit with the current controlling element which operates to receive the radiated control signal. This arrangement has the advantage of providing remote tetherless transmission of logic information from the host vehicle to the fan drive in a manner which is relatively impervious to electromagnetic interference.

Various other features and advantages of this invention will become apparent upon reading the following specification, which, along with the patent drawings, describes and discloses a preferred embodiment of the invention in detail.

The detailed description of the disclosed embodiment makes reference to the accompany drawings.

DETAILED DESCRIPTION OF THE SPECIFIC EMBODIMENT

Figure 1:
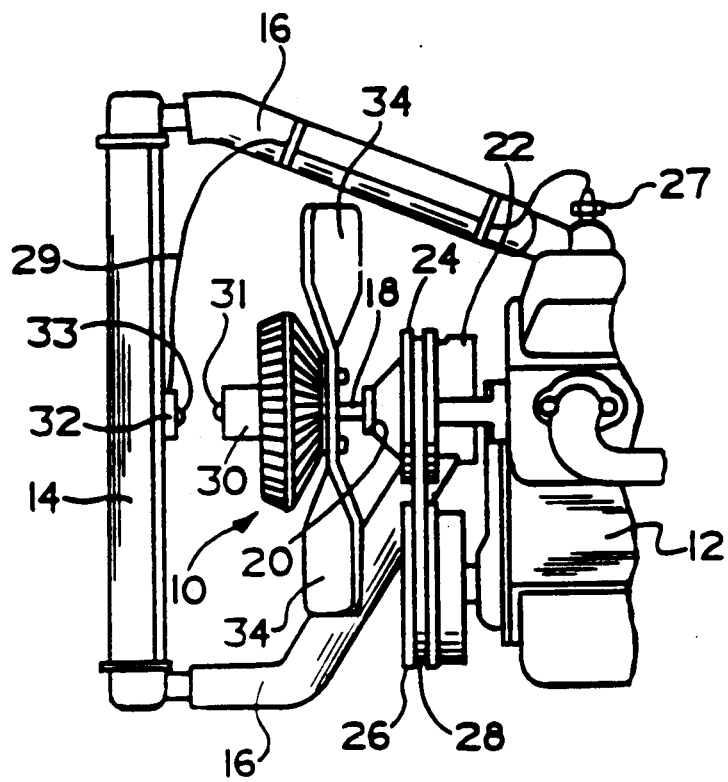
FIG. 1, a side plan broken view of the preferred embodiment of the invention in its intended environment.

Referring to FIG. 1, the preferred embodiment of a viscous fluid clutch 10 is illustrated in its intended environment with a truck or automobile internal combustion engine 12 and radiator 14. Engine 12 and radiator 14 are interconnected by hoses 16 in the usual manner to provide for a flow of fluid coolant from engine 12 through radiator 14 and return to engine 12. Clutch 10 comprises a driving or input shaft 18 including an integral shaft flange 20 which is mounted to an engine coolant pump 22 for rotation therewith. Input shaft 18 and pump 22 are driven through pulleys 24 and 26 by a V-belt 28 as is well known in the art. An actuator assembly 30 is carried on the front (left-hand as viewed in FIG. 1) face of clutch 10. Definitionally, for purposes of the present specification, "grounding" is defined as held immobile with respect to the host apparatus defining an environment surrounding clutch 10. In the case of an automobile, the grounding point is the car body. In the broadest sense, a substantially grounded element can be itself moving with respect to other referenced members but at a substantially lesser rate.

Actuator assembly 30 includes an optical receiving circuit element such as phototransistor 31 facing radiator 14 upon the axis of rotation of clutch 10. A sensor logic module 32 is mounted to grounded radiator 14 opposite actuator assembly 30 and includes an optical transmitting circuit element 33 aligned generally coaxially with receiving element 31 of actuator 30 for communication therebetween. Sensor logic module 32 is electrically interconnected with a remote temperature switch or sender 27 mounted in the engine coolant exit or, alternatively, in the water jacket of radiator 14 by an electrical cable 29. The operation of acuator assembly 30 and logic module 32 will be described in detail herein below. A plurality of fan blades 34 are secured to clutch 10 for rotation therewith.

Referring to FIGS. 2-7, the internal structure of clutch 10 is shown in detail. Flange 20 defines a number of circumferentially spaced apertures 35 which accommodate bolts, (not shown) for mounting clutch 10 to pump 22. Driving shaft 18 is provided with a reduced intermediate portion 36 which functions as an inner race supporting means for a ball bearing assembly 38. A shoulder 40 formed on shaft 18 restrains bearing 38 in one axial direction.

A clutch member 42 is provided with a hub portion 44 and a plate portion 46 having a plurality of concentric annular coupling lands 48 formed on the back side thereof. Hub portion 44 is provided with a straight wall opening 50 which has an interference fit with shaft portion 36 so that clutch member 42 rotates with and is axially retained on shaft 18. Shaft portion 36 and hub 44 each have axially extending slots 52,54, respectively, formed therein receiving a key 56 which prevents relative rotation between shaft 18 and clutch member 42. Hub portion 44 is pressed into shaft portion 36 until it abuts the inner race of bearing 38 to restrain bearing 38 in the other direction of axial movement. Several breathing apertures 58 are formed in clutch member 42 at the point of transition between hub portion 44 and plate portion 46.

A housing assembly 60 comprising a cover member 62 and a body member 64 is mounted for rotation on shaft 18. Body 64 includes a hub 66 which is supported on the lateral surface of the outer race of bearing assembly 38 and is disposed in an interference fit therewith. A shoulder portion 68 of hub 66 reacts against an end surface of the outer race of bearing assembly 38 and limits movement of body 64 in one axial direction. A second shoulder portion 70 also formed in hub 66 of deformed material limits movement of body 64 in the other axial direction. Body 64 and cover 62 are thereby free to rotate about shaft 18 upon bearing assembly 38. Fan blades 34 are secured at the shank portion thereof by bolts 72 at a radially intermediate portion of body 64. Cover 62 is affixed to body 64 by means of a shoulder portion 74 which circumferentially embraces the radially outward most edge of body 64. An elastomeric seal 76 resides in an annular channel 78 in the radially outward most portion of body 64 which abuts cover 62.

Reduced intermediate portion 36 of shaft 18 extends leftwardly (as viewed in FIG. 3) beyond hub 44 of clutch member 42 and receives thereon a roller bearing assembly 80. Bearing assembly 80 includes an outer race 82 which forms a radially inwardly opening recess for receiving the bearing assemblies rollers.

Cover 62 has a hub portion 88 and stepped through bore 90 formed therein. Outer race 82 is press-fit within bore 90 and is restrained from axially displacement in one direction by a step 92 formed in bore 90.

Cover 62 is provided with an annular recess 94 formed on the face thereof on the side adjacent lands 48. A pair of diametrically opposed axially directed holes 96 are disposed slightly radially outwardly of a second set of annular lands 98, which are defined by cover 62. Annular lands 48,98 and the adjoining raised portion of body 64 and cover 62 constitute shear surfaces and define an operating chamber 100 therebetween which operate such as described in U.S. Pat. No. 4,056,178, the specification of which is incorporated herein by reference. Annular lands 48 terminate or alternately are cut away in the form of a V-notch to form three equally spaced radially directed channels the structure defining a known fluid path commencing with the area adjacent lands 48,98, the radial channels, axially directed holes 96 and annular recess 94.

Cooling fins 102 are arranged to provide additional cooling area to dissipate heat which is generated in clutch 10.

A reservoir cover plate 104 cooperates with cover 62 to define an annular fluid storage chamber 106. Cover plate 104 is received in an annular notched recess 108 provided in cover 62 to laterally confine cover plate 104. The material of cover plate 62 is deformed to retain and seal plate 104 in notched recess 108.

Two diametrically opposed radially directed return passage apertures 110 are defined by a thickened portion 111 of cover 62 and interconnect holes 96 with fluid storage chamber 106. The radially outward most end of return passage apertures 110 are sealed with an interference fit ball 112 or other suitable material.

Reservoir cover plate 104 is generally annular in shape and has an inwardly (rightwardly, as viewed in FIG. 3) extending step portion 114 at the radially inward most extent thereof. A generally annular retainer ring 116, having an outwardly (leftwardly) extending step portion 118 is affixed to the outer surface of cover plate 104 such as by welding. Step portion 118 is positioned concentrically with step portion 114. Actuator assembly 30 includes a generally cylindrical housing 122 which is received within step portion 118 of retainer ring 116 and secured thereto by suitable fasteners (not illustrated). Housing 122 includes a rightwardly extending portion of reduced diameter 120 which is nestingly received within step portion 114. Thus, actuator assembly 30 is carried for rotation with cover assembly 60.

Figure 7:
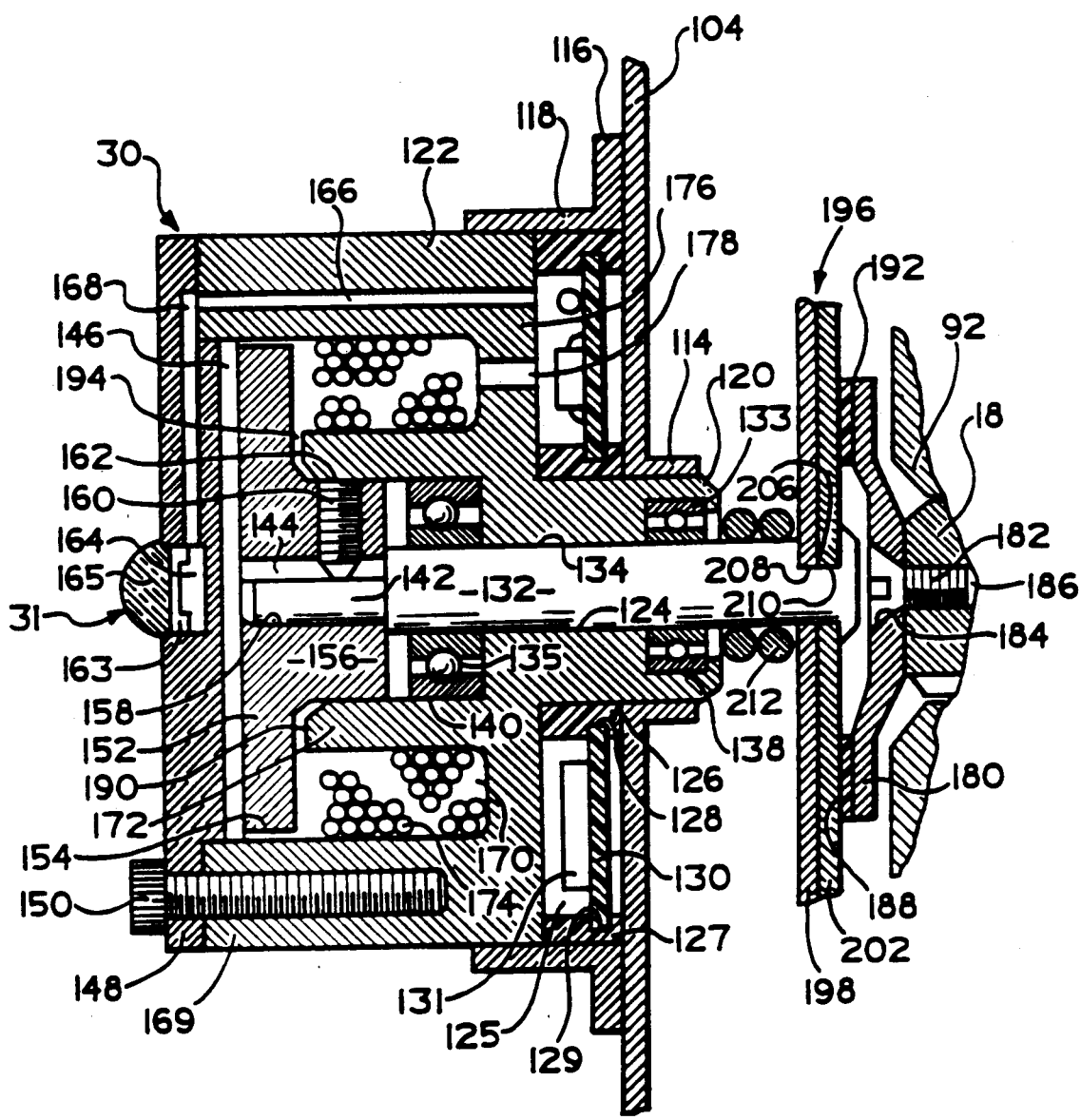
FIG. 7, is the actuator assembly shown in FIG. 3 on an exploded scale to illustrate certain internal details.

Referring particularly to FIG. 7, actuator assembly 30 includes a stepped axial bore 124 therethrough. An armature shaft 132 is slidingly received within and extends through bore 124. Shaft 132 has a central portion 134 dimensioned closely with bore 124 to effect a sliding seal relationship therebetween. Shaft 132 is supported for rotation with respect to housing 122 by two roller bearings 133,135 which have the inner races thereof slip-fit over central portion 134 of shaft 132 and the outer races thereof press-fit within axially spaced areas of increased diameter 138,140 defined by bore 124. Bushings may be substituted in place of bearings 133 and 135. A portion of shaft 132 of reduced diameter 142 extending leftwardly from bearing 135 has a flat 144 formed therein. Bore 124 opens into a cavity 146 within the left-hand end of housing 122 which is closed by a cover 148. Cover 148 is held in assembly with housing 122 by a plurality of circumferentially spaced screws 150 or other suitable hardware or equivalent fastening means.

An armature 152 comprising a plate portion 154 and a hub portion 156 is received within cavity 146. Hub portion 156 has an axial through bore 158 formed therein receiving reduced diameter portion 142 of shaft 132 therein. A set screw 160 is threadably engaged within a bore 162 extending radially through hub portion 156 to engage flat 144 and thereby affix armature 152 to shaft 132.

The right-hand most surface of the major diameter portion of housing 122 is spaced from the leftward most surface of cover plate 104, defining an annular cavity 125 therebetween. Inner and outer annular electrical insulators 126,127, respectively, have concentric outwardly and inwardly opening annular recesses 128,129, respectively, receiving the inner and outer circumferential edges of an annular circuit board 130. Circuit board 130 contains the components of a logic circuit as will be described in detail herein below as well as any necessary counter weights 131 which may be required to keep the entire actuator assembly in dynamic balance. As illustrated, circuit board 130 is mounted for rotation with actuator assembly 30 and is electrically isolated from actuator assembly 30 and cover plate 104 by electrical insulators 126,127.

Optical receiving circuit element 31 is mounted within a blind bore 163 centrally located in the outer (left-hand most as viewed in FIG. 7) surface of cover 148 and includes a phototransistor 164 and a convex lens 165 which serves to seal bore 163. Lens 165 further provides system tolerance for axial misalignment of transmitting and receiving circuit elements 33 and 31, respectively, and will focus the transmitted/received light containing the sensor signal information. It is further contemplated that multiple transmitting/receiving lenses and/or fiber optics could be employed in this regard. Bore 163 communicates with cavity 125 through passageways 166,168 within housing 122 and cover 148, respectively, for routing of wires or the like between circuit element 31 an circuit board 130.

An annular recess 170 extends rightwardly from cavity 146, disposed radially intermediate a sidewall 169 and an inner cylindrical wall 172 which defines area of increased diameter 140. An induction coil 174 is insulatingly received within recess 170 and has its terminating leads extending axially through a passageway 178 in an end wall 176 of housing 122 for interconnection with the components on circuit board 130.

Recess 170 is potted or filled with otherwise suitable material to provide sealing and shock resistance to assembly 30.

Armature 152 is dimensioned to permit limited freedom of axial movement within cavity 146. The left-hand most extent of inner cylinder wall 172 which coacts with a corresponding annular surface portion 194 of plate portion 154 of armature 152 as a variable flux gap. Armature 152 and shaft 132 thus are radially retained by assembly 30 via bearings 133 and 135 but retain complete rotational freedom with respect thereto about the axis of shaft 132 as well as a limited freedom of axial movement between a first position (illustrated) and alternately, a second position in which armature 152 and shaft 132 are displaced leftwardly until the left-hand most surface of armature 152 approaches the right-hand most surface of cover 148. When an electrical current is applied to the leads of coil 174, a magnetic circuit will be established thereabout to draw armature 152 and shaft 132 rightwardly in solenoid fashion.

Figure 2:
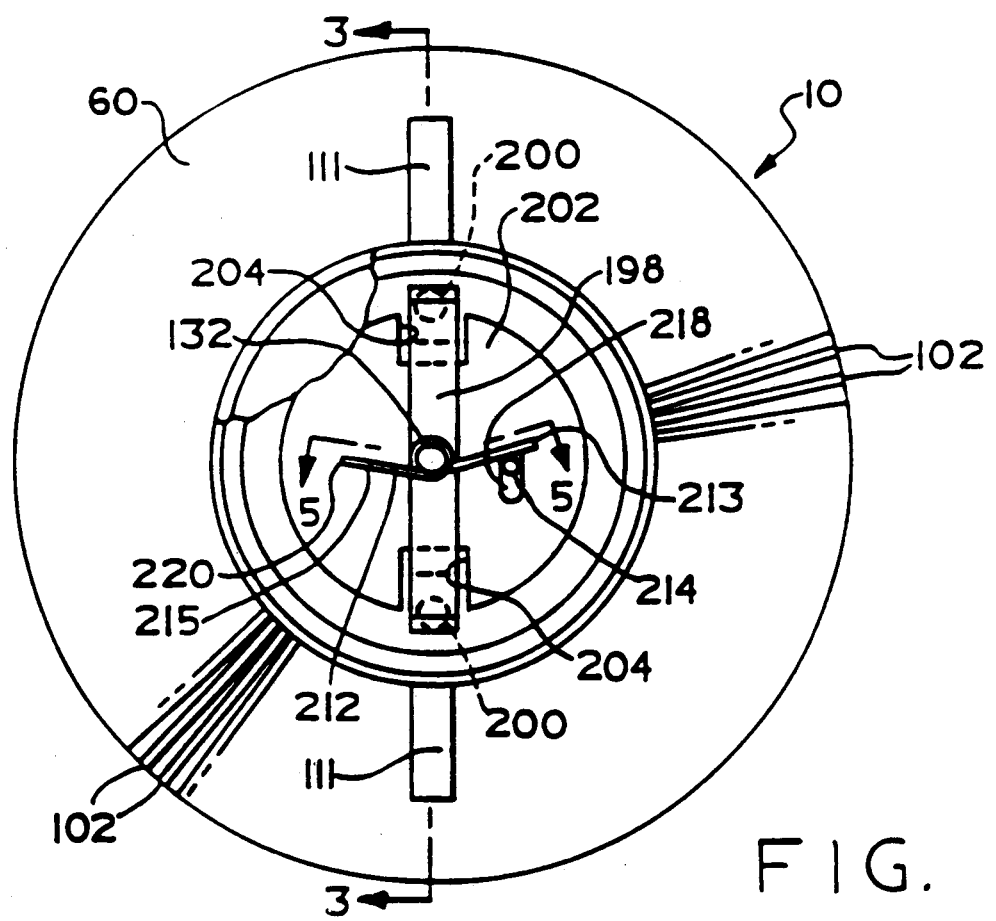
FIG. 2, is a front plan view of the clutch of FIG. 1 on an expanded scale with a portion of the front housing broken away to expose interior details of the fluid storage chamber.
Figure 3:
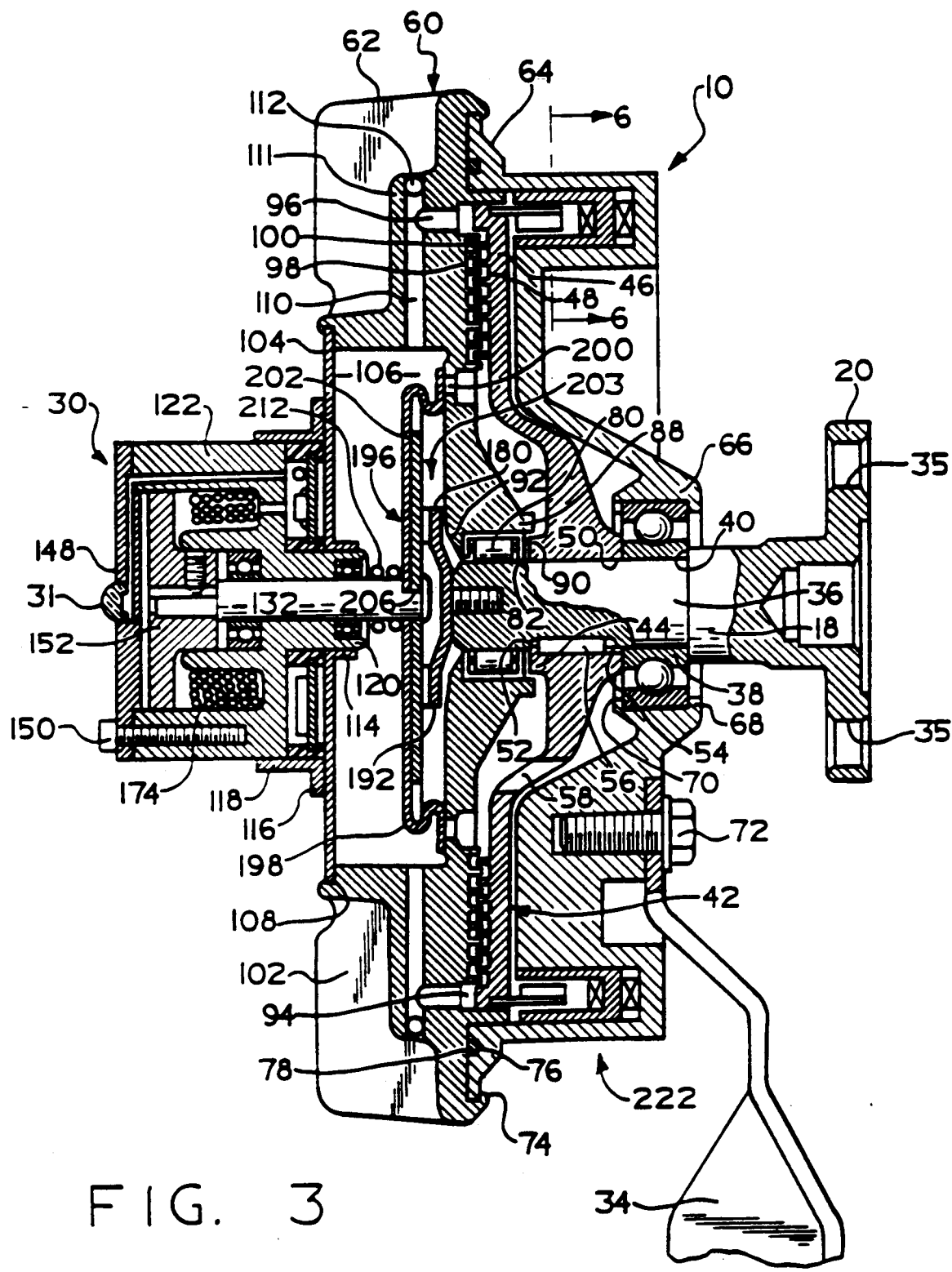
FIG. 3, is a sectional view taken on lines 3—3 of FIG. 2 on an expanded scale.
Figure 4:
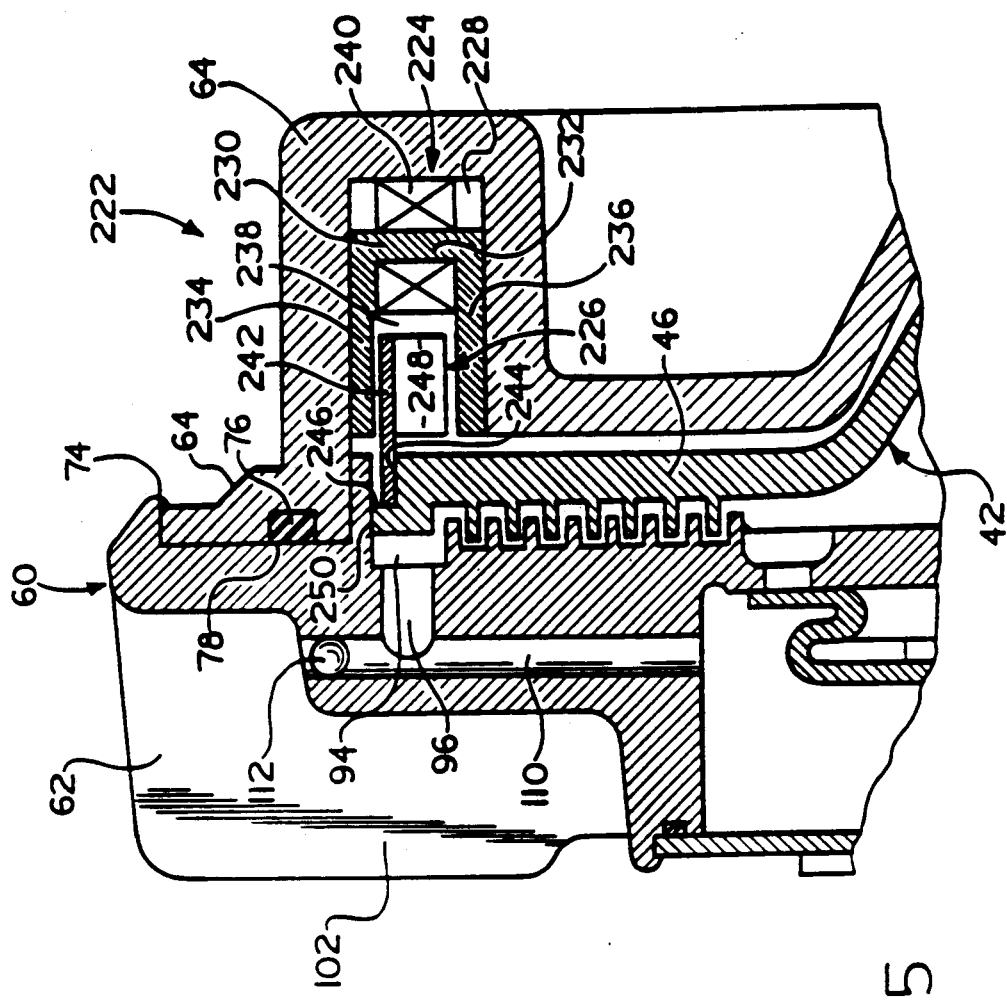
FIG. 4, is the uppermost portion of the clutch shown in FIG. 3 on a greatly expanded scale to illustrate certain internal details.
Figure 5:
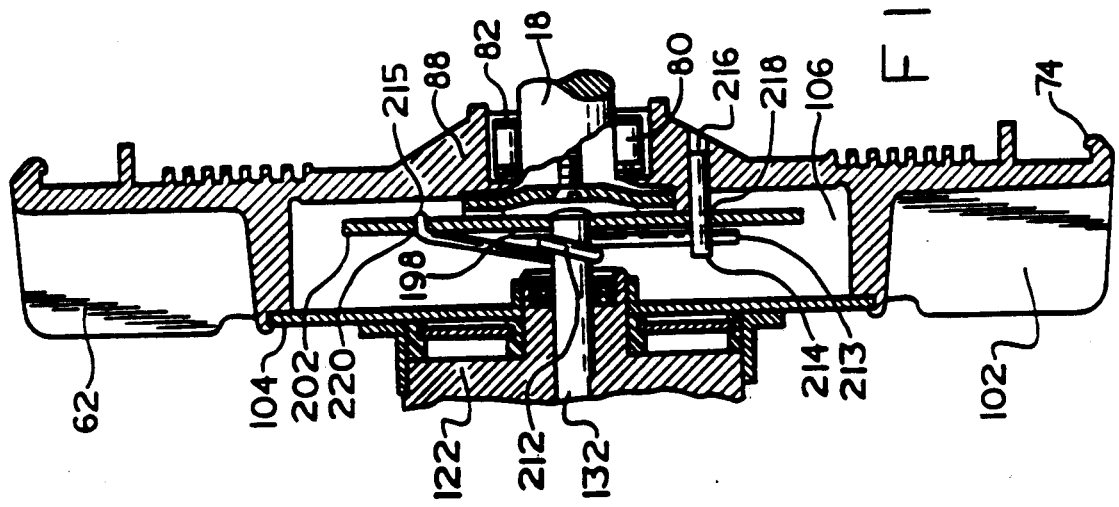
FIG. 5, is a broken sectional view taken on lines 5—5 of FIG. 2 on an expanded scale.

Referring to FIGS. 2, 3, 5, and 7, shaft 132 extends rightwardly from reduced diameter portion 120 of housing 122 within fluid storage chamber 106. An elongated valving element assembly generally designated 196 is disposed within a fluid storage chamber 106 and includes an elongated valve blade 198 which is supported by the right-hand end of shaft 132. The ends of blade 198 terminate in serpentine fashion with the end most portions overlaying relatively large diametrically opposed drain ports 200 which are formed within cover member 62 near the radially outward most extent of fluid storage chamber 106 to provide fluid communication between operating chamber 100 and fluid storage chamber 106. The serpentine nature of the valve blade 198 causes its ends to self bias themselves against the surface of cover member 62 immediately surrounding drain ports 200. Accordingly, as illustrated in FIG. 3, valve blade 198 is pressing rightwardly against the left-hand most surface of cover member 62 within fluid storage chamber 106 to effectively restrict or seal the passageway between chambers 106,100 established by ports 200. The right-hand most end of shaft 132 also supports a circular plate 202 which is of slightly small diameter than fluid storage chamber 106 and which includes two diametrically spaced radially inwardly directed slots 204 which are of a dimension slightly wider than the width of valve blade 198 and are aligned therewith. The right-hand most end of shaft 132 has a flat 206 formed therein which passes through similarly shaped registered apertures 208,210 in valve blade 198 and plate 202, respectively, and are retained upon shaft 132 for displacement therewith such as by swedging of material forming the right-hand most extent of shaft 132. Shaft 132 also passes through a coil spring 212 for retention in its illustrated position. However, spring 212 is dimensioned so as not to interfere with the above described axial displacement of valving element assembly 196. Thus, definitionally, valving element assembly 196 comprises shaft 132, armature 152 valve blade 198, plate 202 and spring 212. Actuator assembly 30 comprises an actuator enclosing housing 122, coil 174, cover 148. Circular plate 202, friction material 192 and thrust member 180 comprises a clutch assembly, shown generally at 203.

Plate 202 and blade 198 are permitted a small degree (5°-30°) of rotation freedom with respect to cover assembly 60. This is accomplished by an anchor pin 214 which is press-fit within an aperture 216 within hub 88 of cover member 62 which projects into fluid storage chamber 106 and through a plane defined by plate 202. Pin 214 passes loosely through a crescent aperture 218 within plate 202. Blade 198 and plate 202 are therefore permitted freedom of rotation with respect to cover assembly 30 only to the extent of the major dimension of aperture 218. In FIG. 2, plate 202 and blade 198 are illustrated in their first or clockwise limit of travel. If plate 202 and blade 198 were rotated counter clockwise until pin 214 abutted the lower most end of aperture 218, plate 202 and blade 198 would be in their second or counter clockwise limit of travel. Coil spring 212 carried by armature 132 has one radially extending end 213 abutting pin 214 and another radially extending end 215 passing through an aperture 220 within plate 202 to urge blade 198 and plate 202 into the second limit of travel (not illustrated). It is contemplated that cresent aperature 218 could easily be repositioned to tend to bias valve 198 and plate 202 in the closed position. Such revision would keep clutch 10 disengaged whenever no signal was received by coil 174.

The right-hand most limit of travel of shaft 132, armature 152, and plate 202 (as illustrated) is established when the right-hand most surface of plate 202 contacts the left-hand most surface of an annular piece of specially selected pyrolytic carbon friction material 192 of the type described in published European Patent Application 0 027 598 and 0 037 104, the specifications of which are hereby incorporated by reference. Friction material 192 is bonded or mounted to the left-hand most peripheral surface of a dish shaped thrust member 180 which is keyed and secured for rotation with input shaft 18 by a screw 182 extending through a tapered central through passage 184 in thrust member 180 to threadably engage an axial blind bore 186 opening leftwardly from the end of input shaft 18. An annular surface 188 of the right-hand most surface of plate 202 adjacent friction material 192 constitutes a thrust surface or reaction member. Pyrolytic friction material 192 is welded or otherwise bonded to thrust member 180 and is specified for use in the interface between valve element assembly 196 and input shaft 18 because of its unique stick-slip characteristics in resistance to wear, particularly at elevated temperatures. Friction materials exhibiting substantially constant or increasing (with temperature and load) coefficient of friction have been found to yield superior performance and longevity in such applications. The specifics of the friction material selection criteria are described in detail in U.S. Pat. No. 4,846,325, the specification of which is incorporated herein by reference.

In operation, coil 174 is energized via an electronic control circuit to establish a magnetic field about coil 174. When full current is flowing through coil 174, valving element 198 will assume the position illustrated in FIGS. 2 and 3. When no current is flowing, valving element 198 will be rotated counter clockwise from the illustrated position by spring 212 and, simultaneously, the spring-like serpentine construction of valve blade 198 will tend to bias valving element assembly 196 axially leftwardly to frictionally disengage plate 202 from friction material 192. It is contemplated that the friction material could be alternately carried by plate 202 and thus engage thrust member 180 with the same effect. With coil 174 de-energized, valve blade 198 will tend to axially displace plate 202 into frictional disengagement with thrust member 180, thereby permitting spring 212 to rotate valve blade 198 and plate 202 from its illustrated position.

When coil 174 is electrically energized, the concentration of flux in the gap between surface 190 and armature 152 will draw valving element assembly 196 to the right (ref. FIG. 7) frictionally engaging plate 202 with friction material 192. Such engagement tends to drag valving assembly clockwise (ref. FIG. 2) in the same rotational sense as engine 12. Because clutch 10, including valving element assembly 196 is rotating at or near engine speed of the host vehicle, and fan 34 will be rotating at a lesser speed dependent upon the operating mode, the differential speed between the two will exhibit a continuous but varying degree of slip causing valve blade 198 to rotate clockwise with respect to cover assembly 60, the amount determined by the coil energization signal. Definitionally, the "slip speed" of clutch 10 equals input shaft speed minus fan speed. The amount of slip within clutch 10 and thus rotating speed of fan blades 34 are directly related to the amount of current flowing within an inductor coil 174. When coil 174 is fully energized, ports 200 will be closed and viscous fluid will tend to accumulate within fluid storage chamber 106. Upon de-energization of coil 174, valve blade 198 rotates counter clockwise, tending to establish fluid communication between the fluid storage chamber 106 and operating chamber 100. When current flow to coil 174 is reduced, the friction drag is likewise reduced and spring 212 tends to move the blade 198 back toward the open position thereby modulating flow of fluid and the fan speed characteristic of the clutch 10.

In operation, the pumping action caused by the sweeping of the radially outward most portion of clutch member 42 by annular recess 94 causes a localized region of increased pressure in the operating chamber 100. This pumping arrangement is well known in the art and is described in U.S. Pat. No. 3,809,197, the specification of which is incorporated herein by reference. The increased pressure causes the viscous fluid in the operating chamber 100 to pass through holes 96 and into return passage aperture 110. The fluid will then pump radially inwardly through return passage 110 and into fluid storage chamber 106. If coil 174 is fully energized and apertures 200 are closed, within a relatively short time virtually all of the fluid will be pumped into return passage 110 and fluid storage chamber 106 causing clutch member 42 and shaft 18 to rotatably slip with respect to cover assembly 60 and fan blades 34. Thus, when the engine is cold, the blades will turn relatively slowly. With the blades turning relatively slowly, the engine temperature, lacking the supplementary cooling action of the fan, will increase toward operating temperature more rapidly then otherwise would be the case.

As will be described in detail below, electrical current within coil 174 will be varied to continuously reposition valving element 198 to effectively control the operating speed of fan blades 34 at the optimum speed. Whenever the valving element 198 is displaced from its position illustrated in FIG. 2, fluid stored in storage chamber 106 will flow through apertures 200 into operating chamber 100 thereby causing the clutch to engage and increasing the relative rate at which the fan 34 is turning. As fluid works itself radially outwardly through operating chamber 100, it is, in turn, pumped through holes 96 and radially inwardly through passages apertures 110 back into fluid storage chamber 106 as described herein above.

Referring to FIGS. 3, 4, 6, 9 clutch 10 contains an on board generator shown generally at 222 which operates to produce the electrical current employed to energize coil 174 as well as circuit components carried upon circuit board 130, thereby eliminating the need for interfacing with an external source of electrical power.

Generator 222 includes an armature shown generally at 224 carried for rotation with cover assembly 60 and an electromagnetic field producing element shown generally at 226 carried for rotation with the plate portion 46 of clutch member 42. Armature 224 and field producing element 226 are positioned for precise rotational alignment about the clutch axis of rotation and rotate with respect to one another at the clutch slip speed. As best viewed in FIG. 4, the right-hand most portion of body member 64 defines a leftwardly opening annular channel 228 about the radially outward most extent thereof Eight pole pieces 230 are evenly circumferentially spaced within channel 228. Each pole piece 230 includes a radially extending base portion 232 and two leftwardly extending leg portions 234,236 depending therefrom. Each pole piece 230 is thus U-shaped in cross section and defines a leftwardly opening arcuate channel 238. Each pole piece 230 has a circumferential dimension of approximately 30 arc degrees and each is spaced from the adjoining pole pieces 230 by approximately 15 arc degrees (refer FIG. 6). Each pole piece 230 has a coil 240 circumferentially wound about its base portion 232. The eight coils designated 240a–h are alternately electrically interconnected in series by bridge leads 241. That is, coils 240a, 240c, 240e and 240g are series connected and coils 240b, 240d, 240f and 240h are series connected. Electrical leads (not illustrated) interconnect coils 240 with circuit board 130.

Field producing element 226 includes a thin hoop or band 242 carried by clutch member 42 upon an annular land 244 formed in the outer circumference of plate portion 46. Positioning of band 242 is precisely determined by a step 246 in plate portion 46 formed adjacent land 244. Band 242 is secured to plate portion 46 such as by welding or suitable fasteners. Sixteen strip permanent magnets 248, each extending approximately 15 arc degrees and spaced 7 ½ arc degrees from the next adjoining magnets are carried by the radially inward most surface of band 242 within arcuate channel 238. Band 242, permanent magnets 248 and pole pieces 230 are dimensioned whereby band 242 and magnets 248 are straddled by the left-hand ends of leg portions 234 and 236 of pole pieces 230 for magnetic interaction therewith. Magnets 248 are alternately radially polarized. Although individual magnet chips or discrete elements are illustrated, it is contemplated that a strip magnet such as ferrite in high temperature plastic could be substituted. Furthermore, field coils or other suitable apparatus can be substituted for the permanent magnets.

Cover assembly 60 as well as clutch member 42 is constructed of aluminum or other suitable non-ferrous material. Hoop 242 is constructed of mild steel and pole pieces 230 are formed of suitable ferrous material whereby upon relative rotation of clutch member 42 and cover assembly 60, magnets 248 will alternately pass through channel 238 of each pole piece 230 and induce a voltage potential across its associated coil 240. With this arrangement, a generally circular flux path, indicated in FIG. 9 generally at 296, will be established extending through leg portion 234, base portion 232

(including coil 240) and leg portion 236 of pole pieces 230, magnet 248, hoop 242 as well as the air gaps between the upper surface of hoop 242 and leg portion 234, and the lower surface of magnet 248 and leg portion 236. Armature 224 will output a generally sinusoidal voltage wave having a frequency functionally dependent upon the slip speed which is applied to the circuitry on circuit board 130.

Magnets 248 are affixed to band 242 by adhesives or other suitable fasteners. The radially outward most circumferentially edge 250 of plate portion 46 of clutch member 42 is positioned closely with the radially outwardly adjoining portion of annular recess 94 to either prevent viscous fluid circulating within clutch 10 from entering channel 228 or alternatively rapidly pump any fluid accumulation from channel 228. It is contemplated that various systems of weirs and/or seals could be provided to effect this result.

Figure 8:
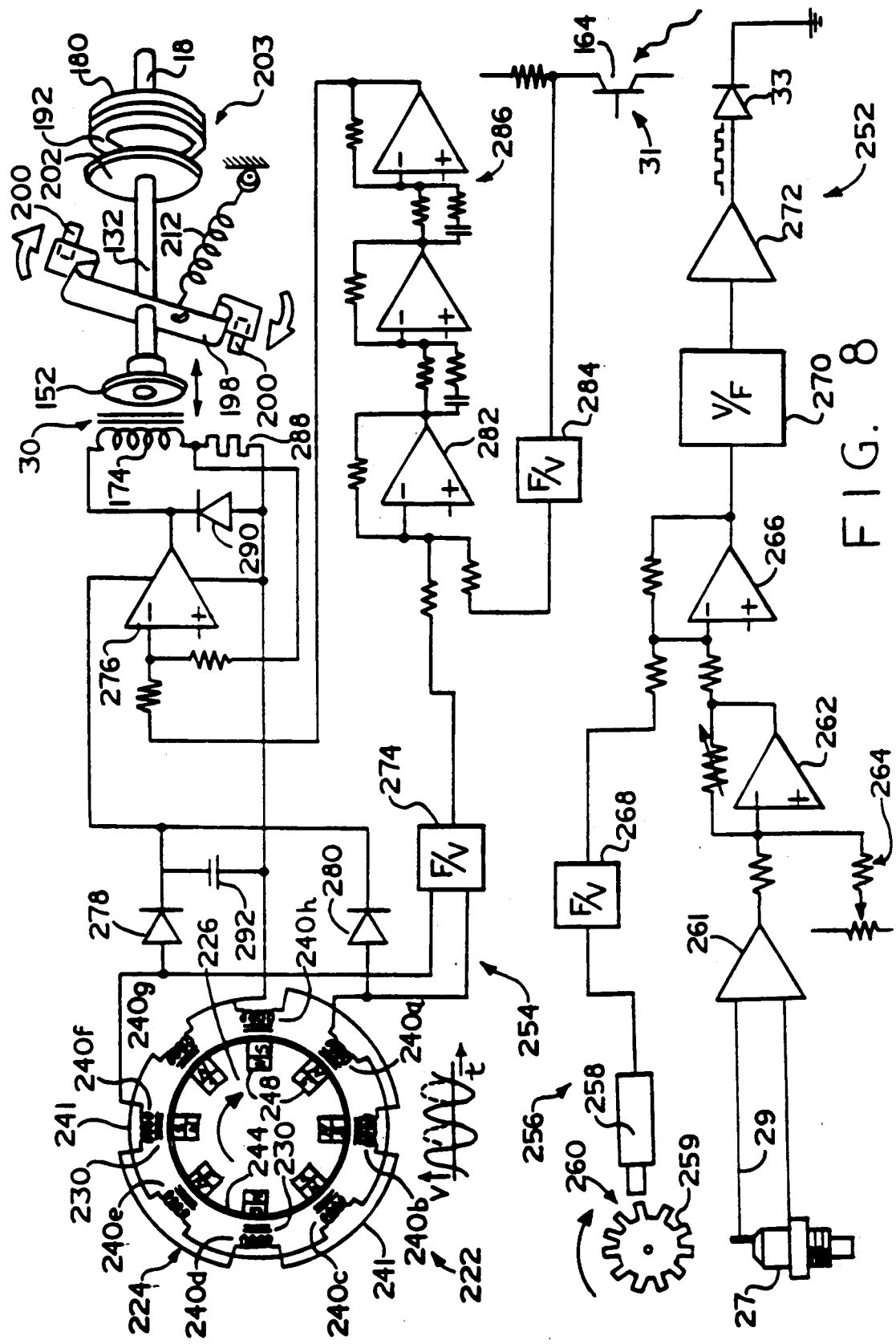
FIG. 8, is a block diagram of the control and logic circuits of the preferred embodiment of the invention.
Figure 6:
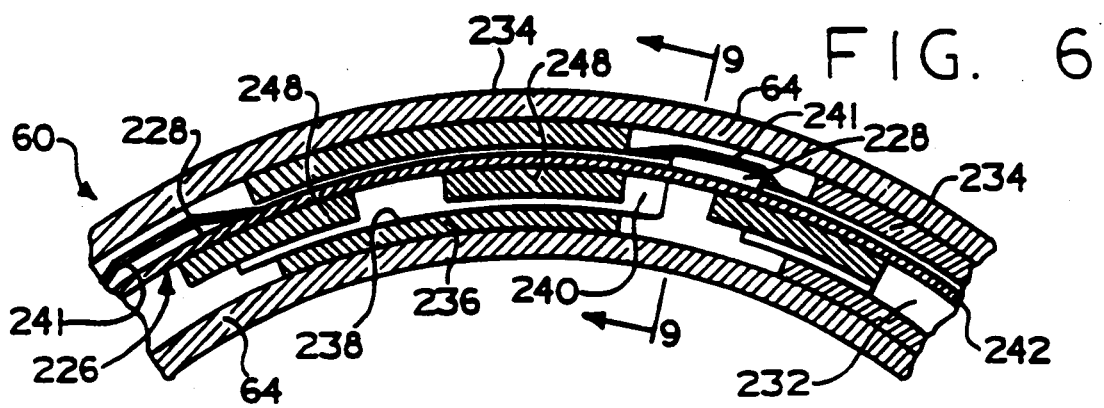
FIG. 6, is a broken sectional view taken on lines 6—6 of FIG. 3.
Figure 10:
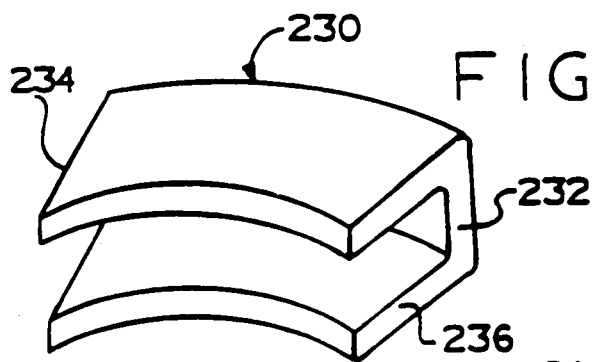
FIG. 10, is a perspective view of one of eight pole pieces employed in the preferred embodiment of the invention.
Figure 9:
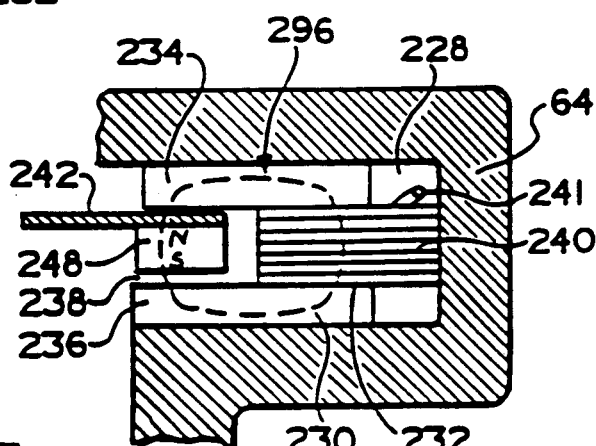
FIG. 9, is a broken sectional view taken on lines 9—9 of FIG. 6 on an expanded scale.

Referring to FIG. 8, the control circuit shown generally at 252 is illustrated comprising a logic circuit 254 and a sensor circuit 256. Due to the harsh environment envisioned in the intended application, circuits 254, 256 require components and packaging of rugged construction and specified for high temperature application. Control circuit 252 functions in many respects in ways similar to the circuit described in U.S. Pat. No. 4,846,325 in which an outer temperature control loop and an inner fan speed control loop strategy is employed for tight control of fan speed with respect to coolant temperature with relative independence of momentary engine speed variations. Furthermore, the system is designed to be failsafe wherein a loss of control current to coil 174 will result in the clutch remaining in the engaged condition for maximum cooling.

Sensor circuit 256 is housed within sensor logic module 32 and includes inputs from remote temperature sensor-sender 27 and a magnetic engine speed sensor 260 including a magnetic pickup 258 and a toothed target wheel 259 suitably mounted on the vehicle chassis and rotating at engine speed, respectively. Temperature sender 27 can be of the type manufactured by Sunstrand, model 555-8-00002. Magnetic pickup 258 is preferably of the permanent type located within the host vehicle engine compartment to directly measure engine speed. Electrical cable 29 from temperature sender 27 as well as a ground lead are connected to the inputs of an instrumentation type amplifier 261, the output signal of which represents coolant temperature which is interconnected to the negative input of an operational amplifier (OP AMP) 262. A temperature set/calibration circuit 264 is also connected to the negative input of OP AMP 262. The output of OP AMP 262 is a fan speed demand signal which is interconnected to the negative input of another OP AMP 266. Engine speed sensor 260 is also connected to the negative input of OP AMP 266 through a frequency to voltage (F-V) converter 268. The output of OP AMP 266 represents a slip speed demand signal and is fed to the input of a voltage to frequency (V-F) converter 270, the output of which is interconnected to the anode of infrared transmitting diode 33 through an amplifier 272. Thus, diode 33 will optically output a slip demand signal from module 32 across the interface to infrared sensitive phototransistor 164 and logic circuit 254 housed within actuator assembly 30 on clutch 10. As an alternative, it is contemplated that only the transmitting diode 33 could be mounted in module 32 and the balance of the components comprising sensor circuit 256 mounted elsewhere on the host vehicle chassis.

As described herein above, permanent magnets 248 rotate adjacent coils 240 which are alternate series connected. The end taps of composite coils 240a,c,e,g and 240b,d,f,h are connected to the inputs of an F-V converter 274 to provide feedback of actual slip speed. Each of the end taps are also interconnected to the source input of a power OP AMP 276 through forward bias diodes 278, 280 to provide rectified unregulated (approximately 12 volts) voltage potential thereto.

Figure 11:
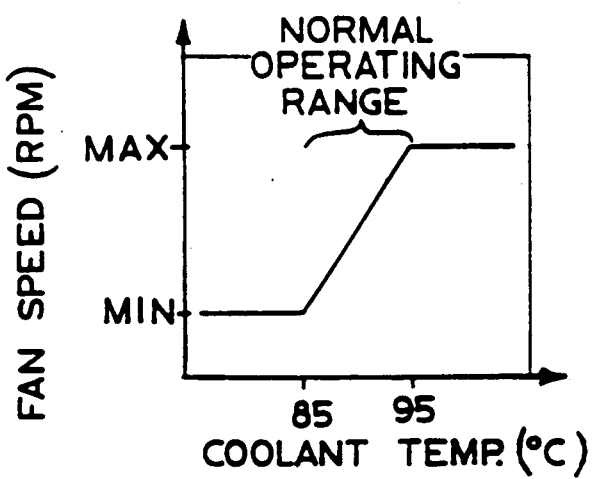
FIG. 11, is a fan speed versus coolant temperature operating characteristic effected by the control and logic circuits of FIG. 8.

The output of F-V converter 274 is interconnected to the negative input of another OP AMP 282. The collector of phototransistor 164 is connected to the input of another F-V converter 284 to reconstitute the analog slip speed demand signal from sensor circuit 256. The output of F-V converter 284 is connected to the negative input of OP AMP 282. The output of OP AMP 282 is interconnected with the negative input of power OP AMP 276 through a speed loop signal stabilization circuit shown generally at 286. The output of power OP AMP 276 is interconnected with a center tap of coils 240 through a series combination of coil 174 and a shunt resistance 288. The output of power OP AMP 276 is also connected to the center tap of coils 240 through a reverse biased flyback diode 290. The point of common connection between clutch coil 174 and shunt 288 s interconnected with the negative input of power OP AMP 276 through a current sensing resistor to provide current feedback for constant current gain. The common terminal of power OP AMP 276 is directly connected to the center tap of coils 240 and one of the outer taps is connected to the center tap through a filter capacitor 292. Power OP AMP 276 thus serves to regulate current flowing from generator 222 to the actuator assembly 30. When clutch coil 174 is energized, valve blade 198 is displaced as described herein above with the cooperative interaction of mechanical friction clutch shown generally at 203 to increase or lessen the circulation of viscous fluid within clutch 10. Control circuit 252 will effect a fan speed versus coolant temperature operating characteristic illustrated graphically in FIG. 11.

It is to be understood that the invention has been described with reference to a specific embodiment which provides the features and advantages previously described, and that such specific embodiment is susceptible of modification as will be apparent to those skilled in the art. For example, in the broadest sense of the invention, any number of data link types between control circuit 252 and logic circuit 254 can be employed as long as it is capable of sustaining real time speed data transfer. Although a coolant temperature sensor 27 is indicated as the control signal source, it is contemplated that alternative or additional inputs such as air conditioning system operating mode, engine speed ambient air temperature, throttle position, operator demand, and the like could be input into sensor logic module 32 for purposes of generating the control signal radiated to receiving circuit element 31. Likewise, any number of types of valve actuators could be employed, not necessarily of the friction clutch type. Non-electromagnetic valve actuation such as an electric current actuated thermo responsive material displacement such as that disclosed in U.S. Pat. No. 4,351,425 could be used as well. Furthermore, more or fewer coils 240 and magnets could be employed depending upon system requirements. The only limitation to the type of actuator requires that it be electrically or electromagnetically actuated by current supplied by generator 220. Accordingly, the foregoing is not to be construed in a limiting sense.

What is claimed is:

1. An improved viscous fluid clutch of the type including first and second members mounted for relative rotation about a common axis defining cooperating shear surfaces, means to establish a flow of viscous fluid between said surfaces, a valving element carried by one of said members to modulate said fluid flow by limited displacement of said element, actuator means responsive to an electrical current to selectively position said element and a grounded sensor operative to generate a control signal as a function of a system parameter, said improvement comprising:

a source of said electrical current;
   circuit means interconnecting said actuator means and source of electrical current, said circuit means operative to modulate the flow of said electrical current in response to said control signal; and
   a non-contacting signal link interfacing said sensor and circuit means including a transmitter element in circuit with said sensor operative to radiate said control signal as a function of said parameter measured by said sensor and a receiving element in circuit with said circuit means operative to receive said radiated control signal.

2. The fluid clutch of claim 1, wherein said circuit means is carried for rotation with at least one of said members.

3. The fluid clutch of claim 2, wherein said circuit means is carried by said element carrying member.

4. The fluid clutch of claim 1, wherein said actuator means is carried by said element carrying member.

5. The fluid clutch of claim 1, wherein said transmitter and receiving elements are substantially aligned near said common axis.

6. The fluid clutch of claim 1, wherein said source of electrical current is disposed within said clutch.

7. The fluid clutch of claim 1, wherein said transmitter and receiving elements are optical devices.

8. The fluid clutch of claim 7, wherein said optical devices radiate and receive said control signal in the infrared frequency spectrum.

9. The fluid clutch of claim 7, wherein said optical devices radiate and receive said control signal in the visible light frequency spectrum.

10. A rotary fluid coupling device as claimed in claim 7 characterized by said valve member being normally in said first position, in the absence of the generation of said electrical current.

11. The fluid clutch of claim 1, wherein said valving element is operable to frictionally engage the other of said members to extract kinetic energy from said other member and input it to said valving element to move said valving element and thereby effect modulation of said flow.

12. A rotary fluid coupling device of the type comprising a first rotatable coupling assembly including a housing member and a cover member cooperating to define a fluid chamber therebetween; valve means associated with said first coupling assembly and being disposed to separate said fluid chamber into a fluid operating chamber and a fluid reservoir chamber and defining a fill port; a second rotatable coupling member disposed in said fluid operating chamber and being rotatable relative to said first coupling assembly, the difference between the speed of rotation of said first coupling assembly and the speed of rotation of said second coupling member comprising a slip speed; a surface of said second coupling member and an adjacent surface of said first coupling assembly cooperating to define a viscous shear space therebetween, operable to transmit torque in response to the presence of viscous fluid; said valve means including a movable valve member operable to control the flow of fluid through said fill port between said reservoir chamber and said operating chamber, said valve means further including an electromagnetic actuator operable to move said valve member in response to receipt of a control signal from a grounded system parameter sensor between a first position substantially preventing fluid communication through said fill port, and a second position permitting substantial fluid communication through said fill port; characterized by:

an electrical current source;
   circuit means interconnecting said actuator and source of electrical current, said circuit means operative to modulate the flow of said electrical current in response to said control signal; and
   a non-contacting signal link interfacing said sensor and circuit means including a transmitter element in circuit with said sensor operative to radiate said control signal as a function of said parameter measured by said sensor and a receiving element in circuit with said circuit means operative to receive said radiated control signal.

* * * * *